(12) United States Patent
Koga

(10) Patent No.: US 8,862,822 B2
(45) Date of Patent: Oct. 14, 2014

(54) INFORMATION PROCESSING APPARATUS AND START-UP METHOD OF THE APPARATUS

(75) Inventor: Kazuhiro Koga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 12/327,653

(22) Filed: Dec. 3, 2008

(65) Prior Publication Data

US 2009/0157960 A1    Jun. 18, 2009

(30) Foreign Application Priority Data

Dec. 12, 2007    (JP) .................. 2007-321264

(51) Int. Cl.
*G06F 12/00*    (2006.01)
*G06F 11/34*    (2006.01)
*G06F 9/44*    (2006.01)

(52) U.S. Cl.
CPC .... *G06F 11/3485* (2013.01); *G06F 2212/2022* (2013.01); *G06F 11/3409* (2013.01); *G06F 9/4418* (2013.01); *G06F 9/4408* (2013.01)
USPC ............ 711/115; 711/154; 711/162; 713/1; 713/2; 713/300; 713/320; 713/323

(58) Field of Classification Search
CPC .................................. G06F 11/3485
USPC .................................. 711/103, 115
See application file for complete search history.

(56) References Cited

U.S. PATENT DOCUMENTS 6,188,626 B1 *  2/2001  Chang .................. 365/189.03
6,260,006 B1 *  7/2001  Wong et al. .............. 703/27
6,336,153 B1 *  1/2002  Izumida et al. ............ 710/20
6,367,022 B1 *  4/2002  Gillespie et al. ........... 713/300
6,523,125 B1 *  2/2003  Kohno et al. .............. 713/320
6,611,919 B1 *  8/2003  Matsuya et al. ........... 713/320

(Continued)

FOREIGN PATENT DOCUMENTS

JP          2001-22464       1/2001
WO    WO2005114359 A1 * 12/2005 ............... G06F 1/16

OTHER PUBLICATIONS

Momentus 5400 PSD, Seagate, copyright 2007, retrieved from http://www.seagate.com/docs/pdf/datasheet/disc/ds_momentus_5400_psd.pdf on Aug. 14, 2013 (2 pages).*

(Continued)

*Primary Examiner* — Sanjiv Shah
*Assistant Examiner* — Daniel C Chappell
(74) *Attorney, Agent, or Firm* — Fitzpatrick, Cella, Harper & Scinto

(57) ABSTRACT

An information processing apparatus on which a non-volatile storage device is mountable is provided. The information processing apparatus comprises: a volatile storage unit; a mount unit that mounts the device; an acquisition unit configured to acquire information of the device; an estimation unit that estimates a resume time from hibernation using the device; a first control unit that controls to store the data stored in the volatile storage unit to the device if the resume time is shorter than a predetermined time and to control not to store the data stored in the volatile storage unit to the device if the resume time is longer than the predetermined time; and a second control unit that controls to read the data from the non-volatile storage unit to the volatile storage unit if the data is stored in the non-volatile storage unit.

6 Claims, 14 Drawing Sheets

(56) References Cited

U.S. PATENT DOCUMENTS

| | | | |
|---|---|---|---|
| 6,798,697 B2* | 9/2004 | Hosono et al. | 365/185.12 |
| 7,010,719 B2* | 3/2006 | Nobuyoshi et al. | 714/6.3 |
| 7,284,149 B1* | 10/2007 | Fisher et al. | 714/5.1 |
| 7,305,502 B2* | 12/2007 | Kadatch et al. | 710/68 |
| 7,490,197 B2* | 2/2009 | Kirshenbaum et al. | 711/112 |
| 7,543,137 B2* | 6/2009 | Terai et al. | 713/2 |
| 7,634,592 B2* | 12/2009 | Kadatch et al. | 710/22 |
| 7,640,440 B2* | 12/2009 | Reece et al. | 713/300 |
| 7,706,532 B2* | 4/2010 | Ito et al. | 380/201 |
| 7,716,505 B2* | 5/2010 | Chao et al. | 713/320 |
| 7,805,571 B2* | 9/2010 | Kirshenbaum et al. | 711/115 |
| 7,917,784 B2* | 3/2011 | de Cesare et al. | 713/320 |
| 7,949,814 B2* | 5/2011 | Chan | 710/304 |
| 8,006,037 B2* | 8/2011 | Kirshenbaum et al. | 711/115 |
| 8,151,102 B2* | 4/2012 | Itoh | 713/2 |
| 8,161,306 B2* | 4/2012 | Reece et al. | 713/320 |
| 8,327,171 B2* | 12/2012 | Reece et al. | 713/320 |
| 2001/0016918 A1* | 8/2001 | Alexander et al. | 713/323 |
| 2003/0025930 A1* | 2/2003 | Tateyama | 358/1.14 |
| 2004/0003223 A1* | 1/2004 | Fortin et al. | 713/1 |
| 2004/0230851 A1* | 11/2004 | Chao et al. | 713/320 |
| 2005/0038981 A1* | 2/2005 | Connor et al. | 713/1 |
| 2005/0097239 A1* | 5/2005 | Kadatch et al. | 710/22 |
| 2005/0149646 A1* | 7/2005 | Kadatch et al. | 710/24 |
| 2005/0265162 A1* | 12/2005 | Tsubakihara | 369/47.1 |
| 2006/0156043 A1* | 7/2006 | Liu et al. | 713/300 |
| 2006/0265617 A1* | 11/2006 | Priborsky | 713/320 |
| 2007/0032228 A1* | 2/2007 | Varanda | 455/418 |
| 2007/0240005 A1* | 10/2007 | Chao et al. | 713/323 |
| 2007/0277051 A1* | 11/2007 | Reece et al. | 713/323 |
| 2008/0022099 A1* | 1/2008 | Kawano et al. | 713/168 |
| 2008/0065845 A1* | 3/2008 | Montero et al. | 711/162 |
| 2008/0168201 A1* | 7/2008 | de Cesare et al. | 710/260 |
| 2008/0168285 A1* | 7/2008 | de Cesare et al. | 713/320 |
| 2008/0276050 A1* | 11/2008 | Hsieh et al. | 711/154 |
| 2009/0077277 A1* | 3/2009 | Vidal et al. | 710/46 |
| 2009/0172439 A1* | 7/2009 | Cooper et al. | 713/323 |
| 2009/0228735 A1* | 9/2009 | Ikeda et al. | 713/502 |
| 2010/0037076 A1* | 2/2010 | Reece et al. | 713/324 |
| 2010/0146253 A1* | 6/2010 | Kawamoto et al. | 713/1 |
| 2010/0306773 A1* | 12/2010 | Lee et al. | 718/1 |
| 2011/0167250 A1* | 7/2011 | Dicks et al. | 713/2 |
| 2012/0185715 A1* | 7/2012 | Reece et al. | 713/323 |
| 2013/0061032 A1* | 3/2013 | Suginaka et al. | 713/2 |

OTHER PUBLICATIONS

Definition of "hibernate mode", Webopedia, retrieved from http://www.webopedia.com/TERM/H/hibernate_mode.html on Aug. 14, 2013 (3 pages).*

Hibernating and Resuming using a Compressed Memory Image NN950873, IBM Technical Disclosure Bulletin, vol. 38, iss. 8, p. 73-74, Aug. 1995 (2 pages).*

Automatic Data Compression Control for Hibernation NN9604185, IBM Technical Disclosure Bulletin, vol. 39, iss. 4, p. 185-186, Aug. 1996 (2 pages).*

* cited by examiner

FIG. 4

| ID 401 | VenderID 402 | ProductID 403 | Serial No. 404 | Device Capacity (MB) 405 | Performance (MB/sec) 406 | Estimation Time (sec) 407 |
|---|---|---|---|---|---|---|
| 1 | 0xA767 | 0x5434 | 10023244 | 256 | 12.5 | 28.5 |
| 2 | 0x5324 | 0x2314 | 20323402 | 1024 | 21.6 | 19.9 |

400

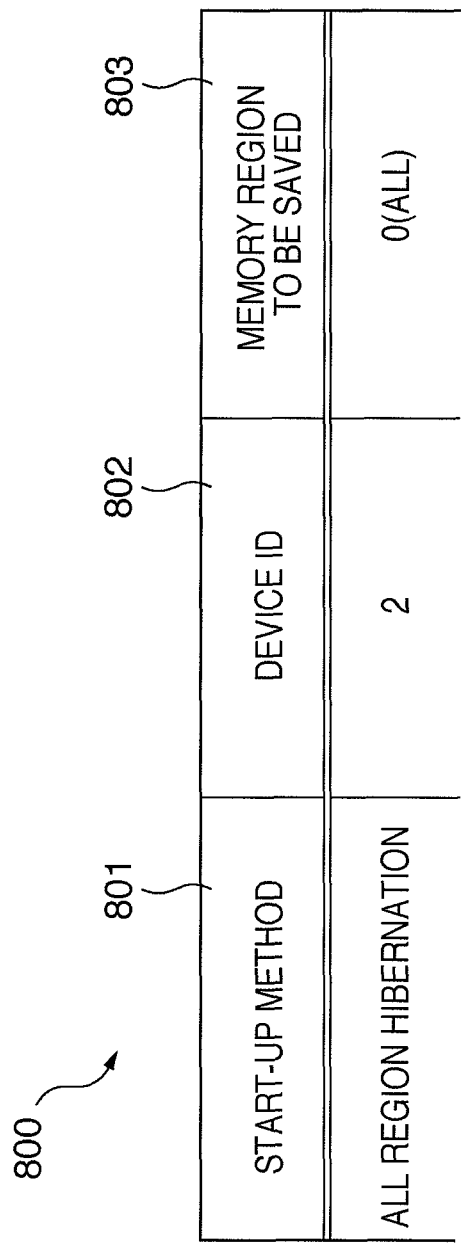

F I G. 10

| ID 1001 | Name 1002 | StartAddress 1003 | Size 1004 | SAVING MANDATORY FLAG 1005 |
|---|---|---|---|---|
| 1 | SystemProgram | 0x00000000 | 32MB | No |
| 2 | OS Heap | 0x02000000 | 8MB | Yes |
| 3 | App Heap | 0x02800000 | 16MB | Yes |
| 4 | App Stack | 0x03000000 | 16MB | Yes |
| 5 | Graphic Work | 0x04000000 | 120MB | No |

1000

INFORMATION PROCESSING APPARATUS AND START-UP METHOD OF THE APPARATUS

BACKGROUND OF THE INVENTION

1. Field of the Invention

The present invention relates to an information processing apparatus and a start-up method of the apparatus.

2. Description of the Related Art

An apparatus including a hibernation function is in practical use in an information processing apparatus of recent years. The hibernation function stores information stored in a main memory to a non-volatile memory device such as a hard disk before the information processing apparatus is turned off. The next time the power is turned on, the operation is restarted from the state just before the power is turned off. The implementation of the hibernation function is advantageous in that the start-up time of the information processing apparatus can be reduced when the power is turned on. However, in the hibernation function, data stored in the main memory needs to be saved in a non-volatile memory device such as a hard disk when the power is turned off, and the saved data needs to be loaded to the main memory at the next power-on. The start-up time may not be able to be reduced since the time required for loading may be longer depending on the amount of saved data. Thus, various methods have been proposed to optimize the data save/load time in the hibernation function. Japanese Patent Laid-Open No. 2001-22464 discloses a method of determining whether to compress the data to be saved upon the execution of the hibernation function by evaluating whether saving after compression of the data to be saved is faster or saving without compression is faster.

The conventional information processing apparatus equipped with the hibernation function is based on an information processing apparatus including a non-volatile memory device such as a high-capacity hard disk. Therefore, the performance of the non-volatile memory device is known in advance. As a result, the save/resume time can be optimized based on saving/loading of data to and from the non-volatile memory device. However, there is an information processing apparatus that does not include a high-capacity non-volatile memory. To use the hibernation function in such an information processing apparatus, the user first needs to mount (connect) a non-volatile memory device on the information processing apparatus and use the mounted non-volatile memory device to realize the hibernation function.

However, the non-volatile memory devices may include various performances for saving data of the main memory in the non-volatile memory device that can be inserted and pulled out or for loading data from the non-volatile memory device. For example, if a non-volatile memory device with low data reading/writing speed is mounted on, the implementation of the hibernation function using the non-volatile memory device makes the start-up time at the power-on long due to the low reading speed. Therefore, depending on the performance of the non-volatile memory mounted on by the user, the start-up time after performing the hibernation may be rather longer than the normal start-up.

Non-volatile memories with various capacities exist as for the non-volatile memory device that is mounted on by the user and that can be inserted and pulled out. Therefore, the mounted non-volatile memory device may not be able to save all data stored in the main memory.

In case of the non-volatile memory device that can be inserted and pulled out, the non-volatile memory device may be removed or replaced by a different non-volatile memory device before the next start-up. In that case, the hibernation function cannot be realized.

The present invention solves the above problems of the conventional technology.

The present invention enables to start up an apparatus without causing the above conventional problems when performing hibernation using a non-volatile storage device that can be mounted.

SUMMARY OF THE INVENTION

According to one aspect of the present invention, there is provided an information processing apparatus on which a non-volatile storage device is mountable, the information processing apparatus comprising: a data processing unit configured to execute data processing by the information processing apparatus; a volatile storage unit configured to store at least data used for the data processing by the data processing unit; a power supply unit configured to supply power to the data processing unit and the volatile storage unit; a mount unit configured to mount the non-volatile storage device; an acquisition unit configured to acquire information of the non-volatile storage device mounted on the mount unit; an estimation unit configured to estimate a resume time from hibernation using the non-volatile storage device based on information of the non-volatile storage device acquired by the acquisition unit and performance of the non-volatile storage device; a first control unit configured to control to store the data stored in the volatile storage unit to the non-volatile storage device if the resume time obtained by the estimation unit is shorter than a predetermined time and to control not to store the data stored in the volatile storage unit to the non-volatile storage device if the resume time obtained by the estimation unit is longer than the predetermined time, when a power supply from the power supply unit to the data processing unit and the volatile storage unit is cut off; and a second control unit configured to control to read out the data from the non-volatile storage unit to the volatile storage unit if the data is stored in the non-volatile storage unit when the power supply from the power supply unit to the data processing unit and the volatile storage unit is resumed.

Further features of the present invention will become apparent from the following description of exemplary embodiments with reference to the attached drawings.

BRIEF DESCRIPTION OF THE DRAWINGS

FIG. 4 is an explanatory view of a data configuration example of a non-volatile memory information storage table according to the present embodiment;

FIG. 8 is an explanatory view of a data configuration of a hibernation setting information table according to the present embodiment;

FIG. 10 is an explanatory view of a data configuration example of a memory management table;

DESCRIPTION OF THE EMBODIMENTS

A preferred embodiment of the present invention will now be described in detail with reference to the attached drawings. The following embodiment does not limit the present invention according to the claims, and some of the combinations of the features described in the embodiment may not be required for solving the above problems of the present invention.

Figure 1:
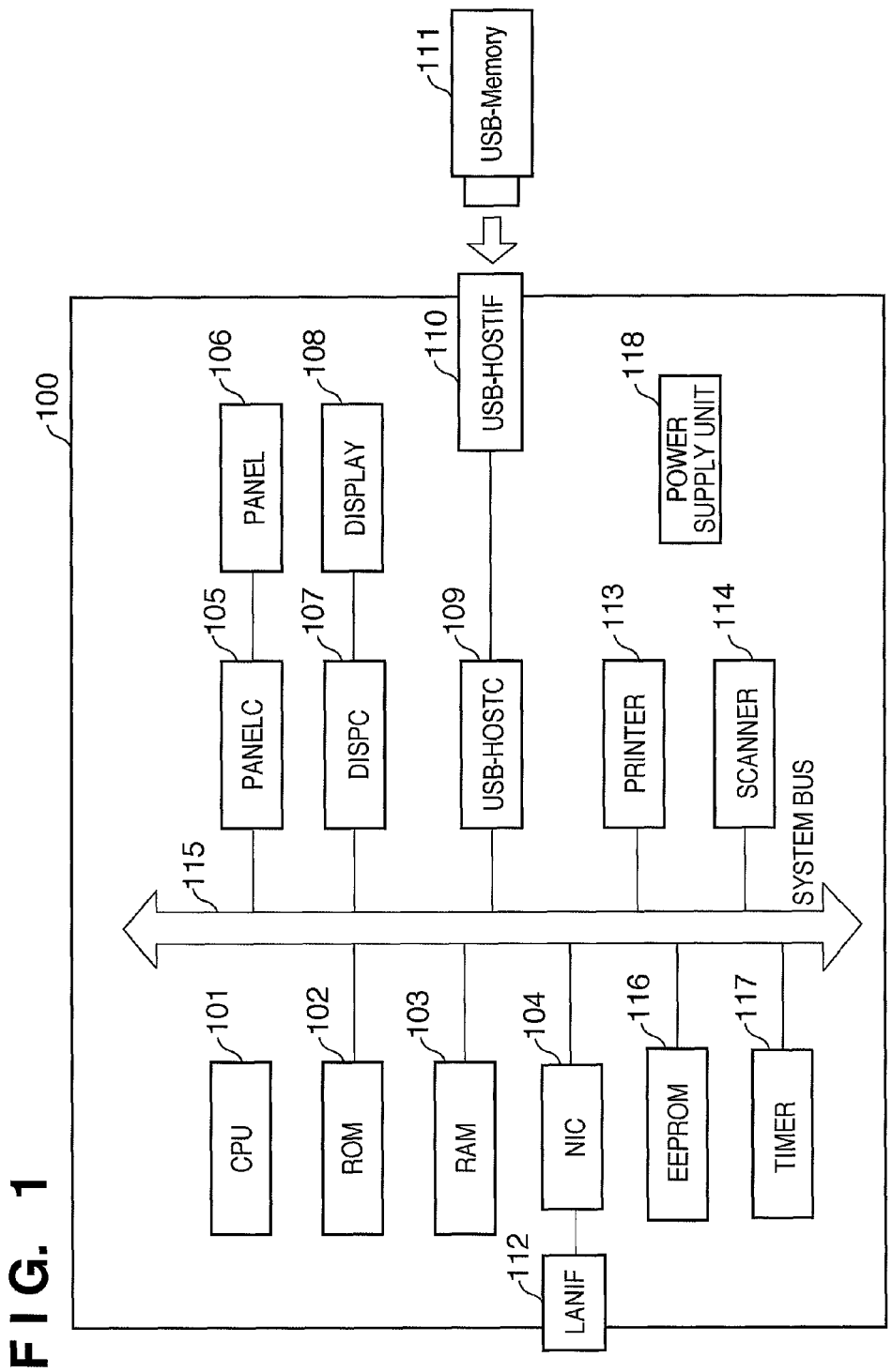
FIG. 1 is a block diagram of a configuration of an image forming apparatus (multi-function peripheral) as an example of an information processing apparatus according to an embodiment of the present invention.

FIG. 1 is a block diagram of a configuration of an image forming apparatus (multi-function peripheral) as an example of an information processing apparatus according to an embodiment of the present invention. The embodiment describes a case of a multi-function peripheral including a printer function, a scanner function, a facsimile function, a storage function, and the like. However, the information processing apparatus of the present invention is not limited to this, but may also be applied to an information processing apparatus of a PC or the like, a game device, and various mobile devices.

In FIG. 1, reference numeral 100 denotes the entire image forming apparatus. A CPU 101 that executes a program stored in a ROM 102 comprehensively controls components connected through a system bus 115 to control the operation of the entire image forming apparatus 100. The CPU 101, a program thereof, and a peripheral circuit constitute a data processing unit and a control unit that control data processing in the image forming apparatus. A RAM 103 functions as a main memory, a work area, and the like of the CPU 101. A panel controller 105 outputs an instruction to the system bus 115, the instruction input by operating various buttons or a touch panel of a panel 106 of the image forming apparatus 100. A display controller 107 controls the display on a display 108 constituted by, for example, a liquid crystal. A network interface card 104 connects a LAN cable to a LANIF 112 and bi-directionally exchanges data with other network devices or file servers. An EEPROM 116 is a rewritable small-capacity non-volatile memory (built-in non-volatile memory) and stores various setting information of the image forming apparatus 100. A USB-Host controller 109 is a host controller of a USB and exchanges data with or controls a USB device connected to a USB-HOSTIF 110. The USB device is a USB memory 111 herein and is a device capable of reading and writing as a non-volatile memory. Connecting the USB memory 111 to the USB-HOSTIF 110 enables the CPU 101 to read and write data through the USB-Host controller 109. A printer unit 113 is, for example, an electrophotographic or ink-jet printer unit. A scanner unit 114 is an image reading unit that reads and converts a document to an electrical signal. The scanner unit 114 may further include an auto document feeder (ADF, not shown). The use of the ADF enables to continuously read a plurality of documents. A timer 117 measures an elapsed time according to an instruction from the CPU 101.

The image forming apparatus 100 further includes a power supply unit 118 that generates a DC voltage supplied to the components of the image forming apparatus 100 based on an input of an AC voltage from a commercial power supply. The power supply unit 118 supplies power to the components of the image forming apparatus 100 when the main power switch is ON and cuts off the power supply to the components when the main power switch is OFF.

Figure 2:
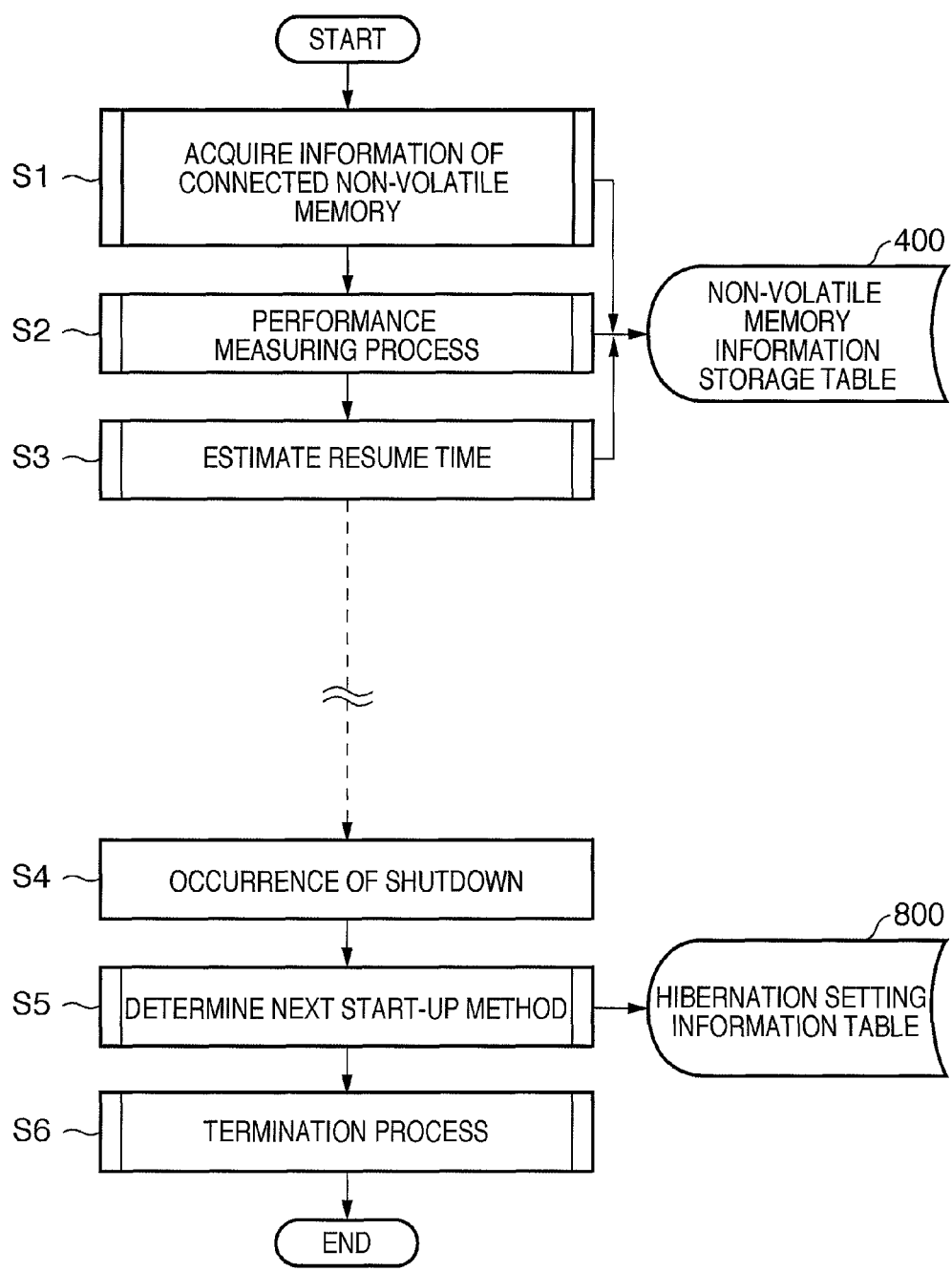
FIG. 2 is a flow chart for explaining a process in the image forming apparatus according to the present embodiment.

FIG. 2 is a flow chart for explaining an outline of a process for determining a start-up method for the next power-on at the system shutdown in the image forming apparatus according to the present embodiment. In the basic operation described herein, after detecting that a USB memory as an example of the non-volatile storage device is mounted on, the image forming apparatus measures the performance of the USB memory, estimates the resume time from hibernation, and determines a start-up method for the next power-on. The basic operation will be roughly described herein with reference to the flow chart of FIG. 2, and details of the processes will be described in detail with reference to other figures. A program for executing the process is stored in the ROM 102, and the program is executed under the control of the CPU 101.

In step S1, information related to the non-volatile memory (USB memory) 111 connected to the USB-HOSTIF 110 is acquired, and the information is registered to a non-volatile memory information storage table 400 of the EEPROM 116. The process proceeds to step S2, and a process for measuring the performance of the connected USB memory 111 is executed. The result is stored in the non-volatile memory information storage table 400. The process proceeds to step S3, and a resume time from hibernation is estimated based on performance data obtained by the performance measuring process of step S2. The estimated result is stored in the non-volatile memory information storage table 400. Up to this point is a brief flow from estimating the resume time in the recognized non-volatile memory to storing the resume time in the non-volatile memory information storage table 400.

The process proceeds to step S4, and when a shutdown event actually occurs in step S4, the process proceeds to step S5 and a process for determining the start-up method for the next power-on is executed. The result is stored in a hibernation setting information table 800. The hibernation setting information table 800 is also written and stored in the EEPROM 116. Since the table is stored in the EEPROM 116, the content is not cleared when the image forming apparatus 100 is turned off, and the information can be referenced at the next power start-up. The process proceeds to step S6, and a termination process is executed in accordance with the start-up method stored in the hibernation setting information table 800 to complete the shutdown.

Details of the processes will now be described in detail.

A process of recognizing the USB memory 111 connected to the USB-HOSTIF 110 and acquiring the information will be described with reference to a flow chart of FIG. 3.

Figure 3:
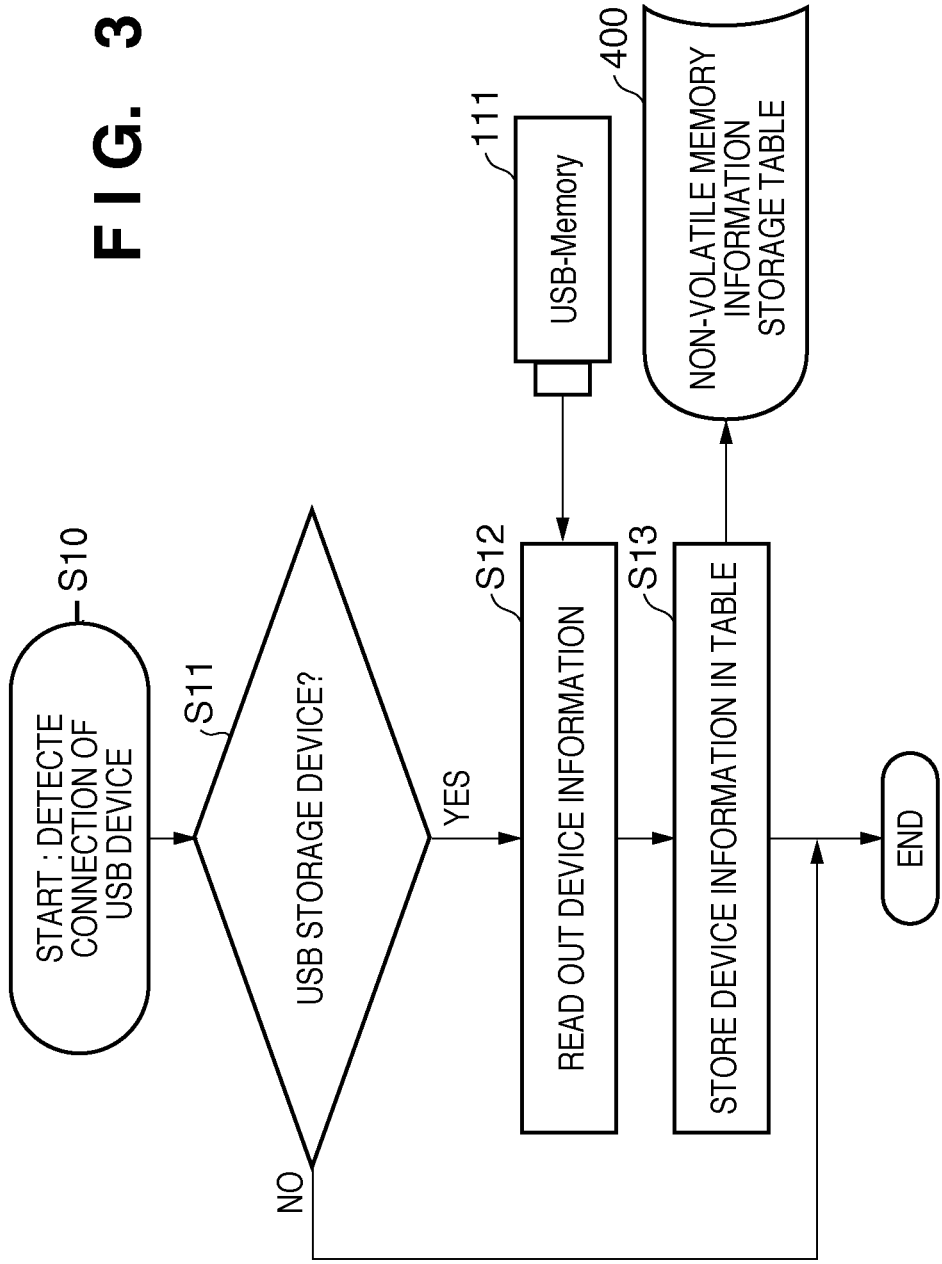
FIG. 3 is a flow chart for explaining a process of step S1 of FIG. 2.

FIG. 3 is a flow chart for explaining the process of step S1 of FIG. 2.

In step S10, the process is started by the USB-Host controller 109 detecting that the USB memory 111 is mounted on the USB-HOSTIF 110. In step S11, whether the type of the mounted USB device is a USB memory is determined. If the device is not a USB memory ("NO" in step S11), the process is terminated. If the device is a USB memory ("YES" in step S11), the process proceeds to step S12, and device information related to the memory is read out from the recognized USB memory 111. In this case, various information, such as a vender ID, a product ID, a serial No., and a device capacity (storage capacity of memory), that enables to uniquely specify the memory device is read out from the USB memory 111. The process proceeds to step S13, and the information read out in step S13 is stored in the non-volatile memory information storage table 400.

FIG. 4 is an explanatory view of a data configuration example of the non-volatile memory information storage table 400 according to the present embodiment.

A device ID 401 is device identification information (ID) that can uniquely specify the USB memory 111. Once a new USB memory 111 is recognized, a new ID is allocated to the USB memory 111, thereby enabling to uniquely specify the memory. A vender ID 402 is a value for identifying a manufacturer or a seller of the USB memory 111. A product ID 403 is a value for identifying a product of the USB memory 111. A serial No. 404 is a production number of the USB memory 111. A set of the vender ID 402, the product ID 403, and the serial No. 404 enables to uniquely specify the USB memory 111.

In step S1 of FIG. 2 described above, the set of the values of the recognized USB memory 111 and the values registered in the non-volatile memory information storage table 400 are compared. If not all of the values match, it is determined that a new USB memory is mounted. After the determination of the new USB memory, the information of the mounted USB memory 111 is newly registered in the non-volatile memory information storage table 400.

A device capacity 405 of FIG. 4 stores a memory capacity of the USB memory 111. The non-volatile memory information storage table 400 further includes fields for storing performance data 406 of the memory and an estimation time 407 of the resume time, which will be described in detail below.

A process of measuring the performance of the USB memory 111 in step S2 of the flow chart of FIG. 2 will now be described.

Figure 5:
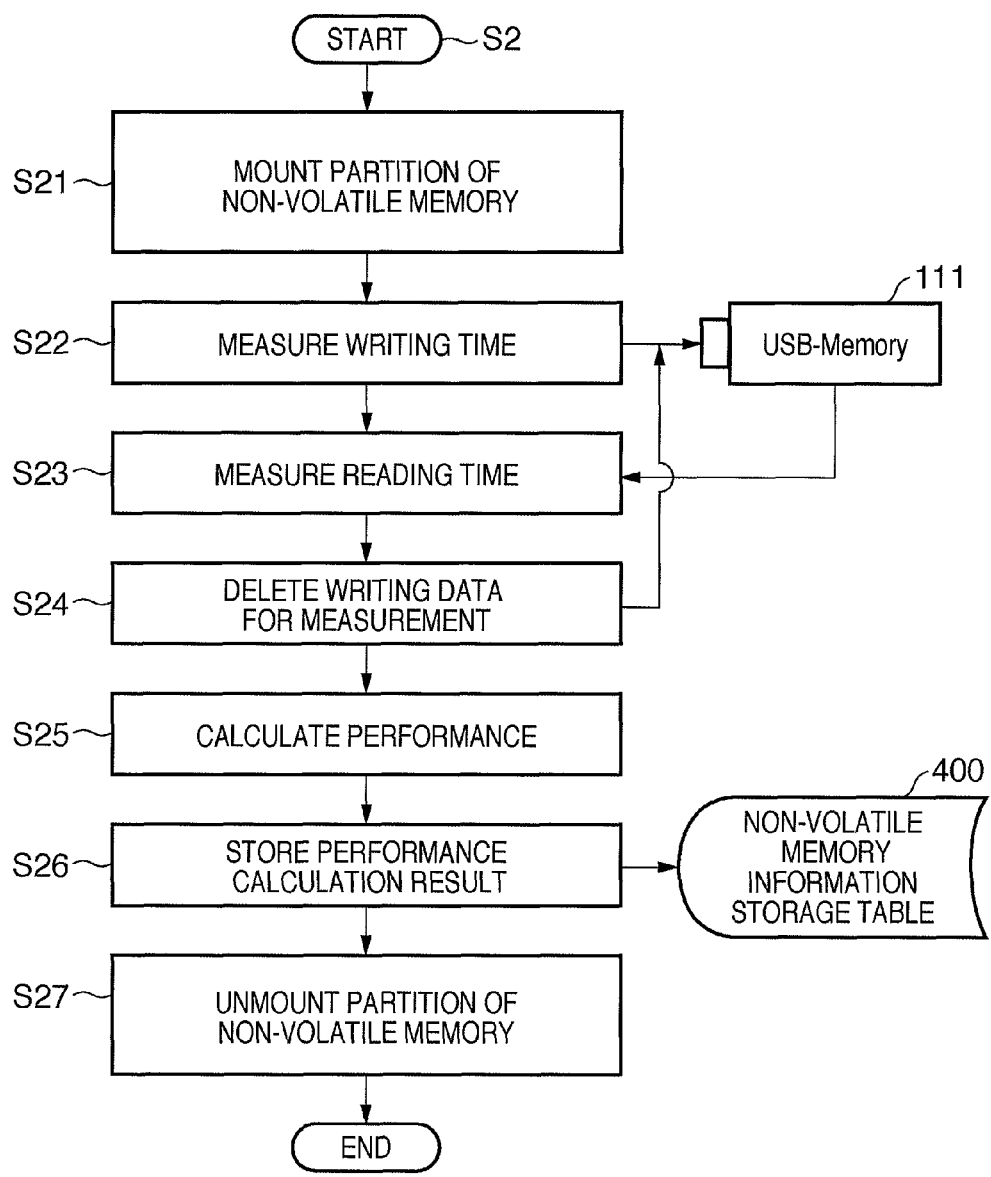
FIG. 5 is a flow chart for explaining a process of step S2 of FIG. 2.

FIG. 5 is a flow chart for explaining the process of step S2 of FIG. 2.

In step S21, a partition of the connected USB memory 111 is mounted. The mounting operation is necessary for reading and writing the mounted USB memory 111 as a file system. In step S22, a predetermined amount of data is written into the USB memory 111, and the time required for the writing is measured. A timer 117 is used for measuring the time. The process proceeds to step S23, and a predetermined amount of data is read out from the USB memory 111, and the time required for the reading is measured using the timer 117. The process proceeds to step S24, and the measurement data written in steps S22 to S23 for measuring the performance of the USB memory 111 is deleted. The process proceeds to step S25, and the performance of the USB memory 111 is calculated based on the amount of data read and written in steps S22 and S23 and the times required for reading and writing. The performance of the memory is calculated by dividing the amount of data read and written by an average value of the times required for reading and writing. The process proceeds to step S26, and the performance data obtained in step S25 is saved in the performance data 406 of the non-volatile memory information storage table 400. When the performance measurement of the USB memory 111 is finished, the partition mounted on the USB memory 111 is unmounted in step S27 to finish the performance measurement.

As a result of the processes, the mounted USB memory 111 can be recognized, and the performance data can be obtained and registered in the non-volatile memory information storage table 400.

A process for estimating the resume time for the next power-on in step S3 of FIG. 2 will now be described.

Figure 6:
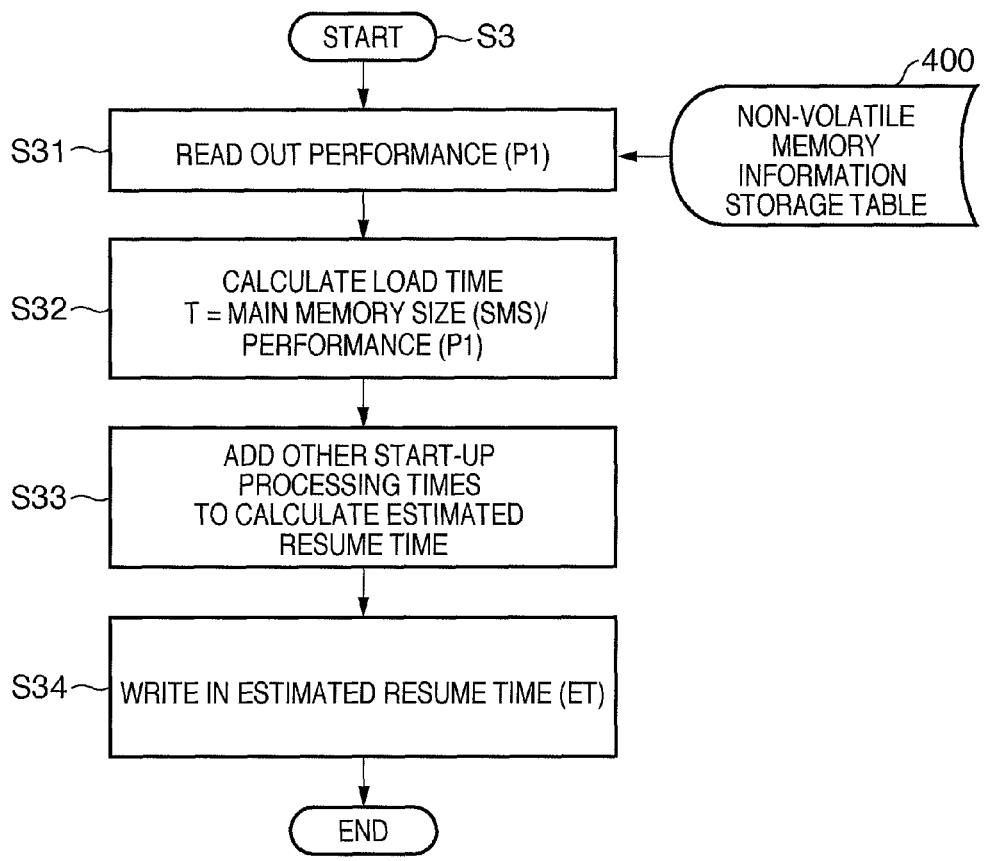
FIG. 6 is a flow chart for explaining a predictive process of a resume time (step S3 of FIG. 2) in the image forming apparatus according to the present embodiment.

FIG. 6 is a flow chart for explaining a predictive process of the resume time (step S3 of FIG. 2) in the image forming apparatus according to the present embodiment.

In step S31, the performance data 406 is read out from the non-volatile memory information storage table 400 in which the performance measurement result of the USB memory is stored. The performance data read out here is defined as "P1". The process proceeds to step S32, and the time required for loading the data saved in the USB memory 111 is calculated from the performance data read out in step S31. An all region size SMS of the main memory (RAM 103) is divided by the performance data "P1" to obtain an approximate load time T. The load time to the main memory, the time for initializing the devices connected to the image forming apparatus 100 according to the present embodiment, and the like are required for the actual resume time by hibernation. Therefore, in step S33, other start-up processing times DIT are added to the load time T obtained in step S32 to calculate an estimated resume time ET. The process proceeds to step S34, and the estimated resume time ET obtained in step S33 is stored in the estimation time 407 of the non-volatile memory information storage table 400.

The estimated resume time obtained in the start-up time predictive process is stored in the non-volatile memory information storage table 400. A process for determining a start-up method for the next power-on with reference to the estimated resume time will be described.

The process for determining the next start-up method by comparing the resume time obtained in the hibernation start-up predictive process and a start-up time of a normal start-up when an event of shutdown has occurred in step S4 of FIG. 2 will be described with reference to flow charts of FIGS. 7A and 7B.

Figure 7A:
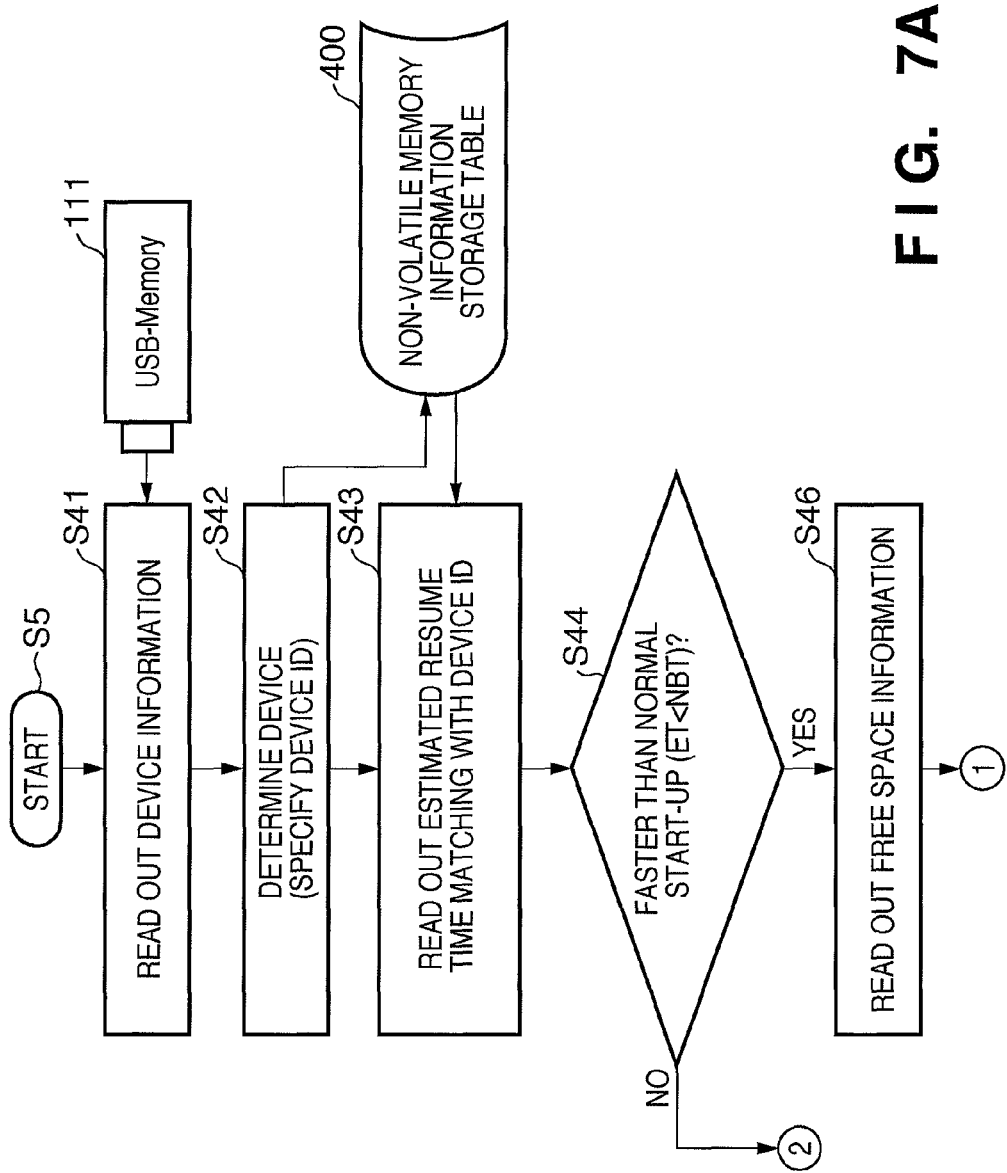
FIGS. 7A and 7B are flow charts for explaining a determination process of a next start-up method in step S5 of FIG. 2.
Figure 7B:
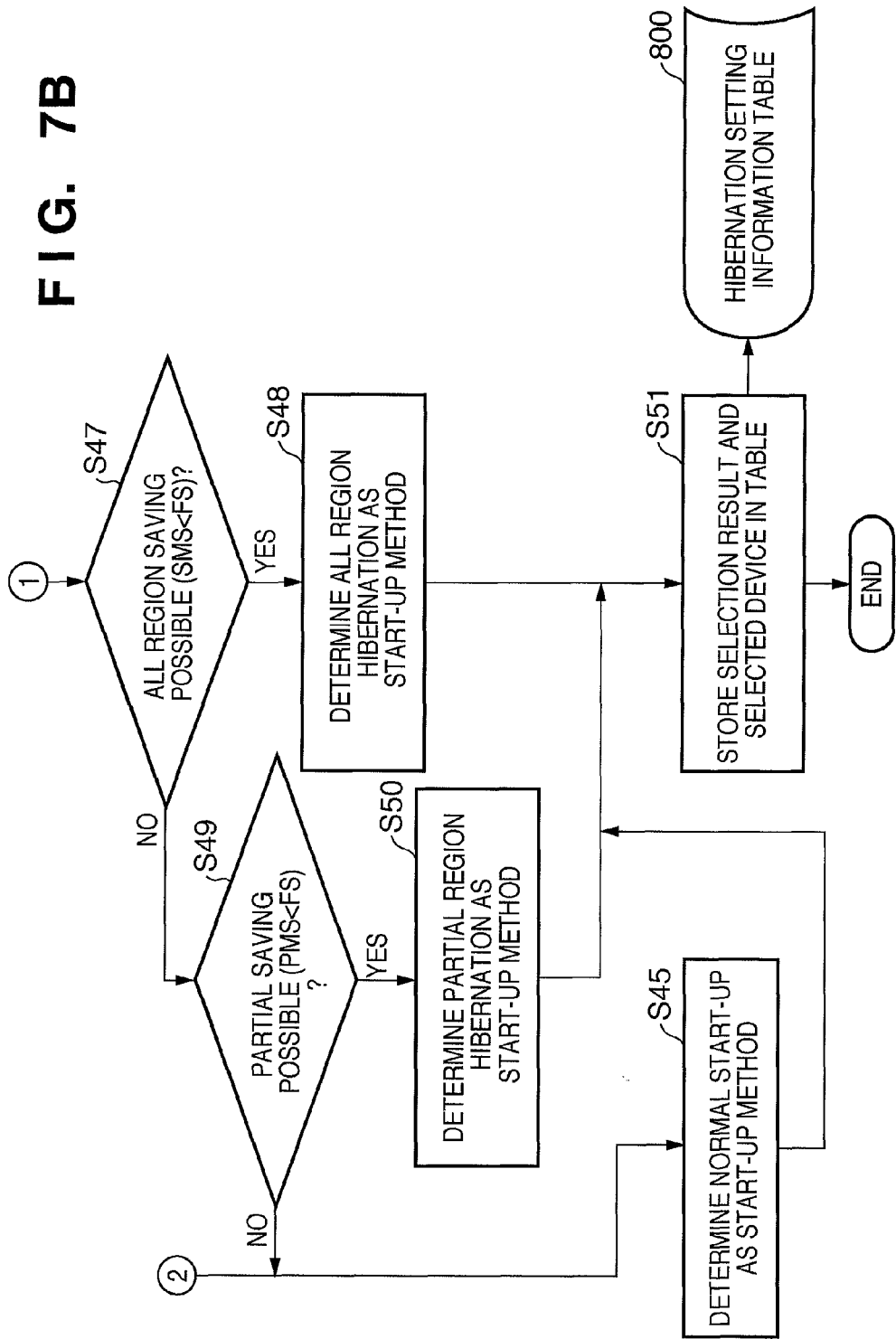

FIGS. 7A and 7B are flow charts for explaining a determination process of the next start-up method in step S5 of FIG. 2.

Whether the mounted USB memory 111 is a device already stored in the non-volatile memory information storage table 400 needs to be determined first. Thus, device information of the USB memory 111 is read out in step S41. The process proceeds to step S42, and whether the device with the same ID vender 402, the product ID 403, and the serial NO. 404 exists is searched from the non-volatile memory information storage table 400. Specifically, whether the information of the mounted USB memory 111 matches with the content of the vender ID 402, the product ID 403, and the serial No. 404 stored in the non-volatile memory information storage table 400 is determined, and the device ID 401 is specified. A new device ID 401 is set if the information of the mounted USB memory 111 is not registered in the non-volatile memory information storage table 400. Values of the vender ID 402, the product ID 403, the serial No. 404, the device capacity 405, the memory performance data 406, and the estimation time 407 are set.

The process proceeds to step S43, and the estimated resume time ET stored in the record of the device ID specified in step S42 is read out. The process proceeds to step S44, and whether the estimated resume time ET read out in step S43 is shorter than a normal start-up time NBT is determined. If the normal start-up time NBT is determined to be shorter ("NO" in step S44), the process proceeds to step S45, and the normal start-up is determined as a start-up method.

On the other hand, if the estimated resume time ET is determined to be shorter in step S44 ("YES" in step S44), whether saving for resumption by hibernation is possible is determined (steps S46 to S50). Details of the process for determining whether the saving for hibernation is possible will be described below.

Lastly, the start-up method determined in any of steps S45, S48, and S50 and the device information to be saved are registered in the hibernation setting information table 800 in step S51.

In this way, the estimated resume time by hibernation calculated by measuring the performance of the USB memory 111 and the normal start-up time are compared, and a faster start-up method can be selected.

A process for storing the start-up method determined in the forgoing description will now be described using flow charts of FIGS. 7A and 7B and an example of the hibernation setting information table of FIG. 8.

FIG. 8 is an explanatory view of a data configuration of the hibernation setting information table 800 according to the present embodiment.

The hibernation setting information table 800 includes a start-up method 801, a device ID 802, and a memory region to be saved 803. The start-up method 801 stores the determined start-up method. If the start-up by hibernation is determined, the device ID of the USB memory 111 as a saving destination is stored in the device ID 802, and information of a saving target region is stored in the memory region to be saved 803. An application of the memory region to be saved will be described later. A process for storing the determination result and the USB device to the hibernation setting information table 800 is executed in step S51 of FIG. 7B, and the process for determining and storing the start-up method is finished.

The determined start-up method is stored in the non-volatile EEPROM 116 as the hibernation setting information table 800. This enables to determine which start-up should be performed at the start-up of the next power-on.

A process for determining whether data of all regions of the main memory can be saved in the connected USB memory 111 will be described using the flow charts of FIGS. 7A and 7B.

In step S44, the start-up time NBT of normal start-up and the estimated resume time ET by hibernation are compared. If it is determined that the hibernation allows faster start-up ("YES" in step S44), the process proceeds to step S46, and a free space of the USB memory 111 is read out. If the partition of the USB memory 111 is mounted, a free space FS can be acquired from file system information of the mounted USB partition. The process proceeds to step S47, and the all region size SMS of the saving targets of the main memory and a free size FS obtained in step S46 are compared to determine whether data of all regions SMS of the main memory can be saved in the USB memory 111. If the data of all regions can be saved ("YES" in step S47), the process proceeds to step S48 to determine all region hibernation as the start-up method. The all region hibernation is a hibernation performed after all data of the saving target regions of the main memory is saved in the USB memory 111.

On the other hand, if all data of the saving target regions of the main memory cannot be saved in the USB memory 111 in step S47 ("NO" in step S47), the step proceeds to step S49, and whether partial saving is possible is determined.

The process proceeds to step S49 if all data of the saving target regions of the main memory cannot be saved in the USB memory 111 ("NO" in step S47), and whether the hibernation start-up by partial saving is possible is determined. In step S49, a total size PMS of the mandatory regions to be saved and the free space FS of the USB memory 111 are compared. If the free space FS of the USB memory 111 is larger ("YES" in step S49), it is determined that the partial saving is possible. The process proceeds to step S50, and partial region hibernation is determined as the start-up method.

Figure 9:
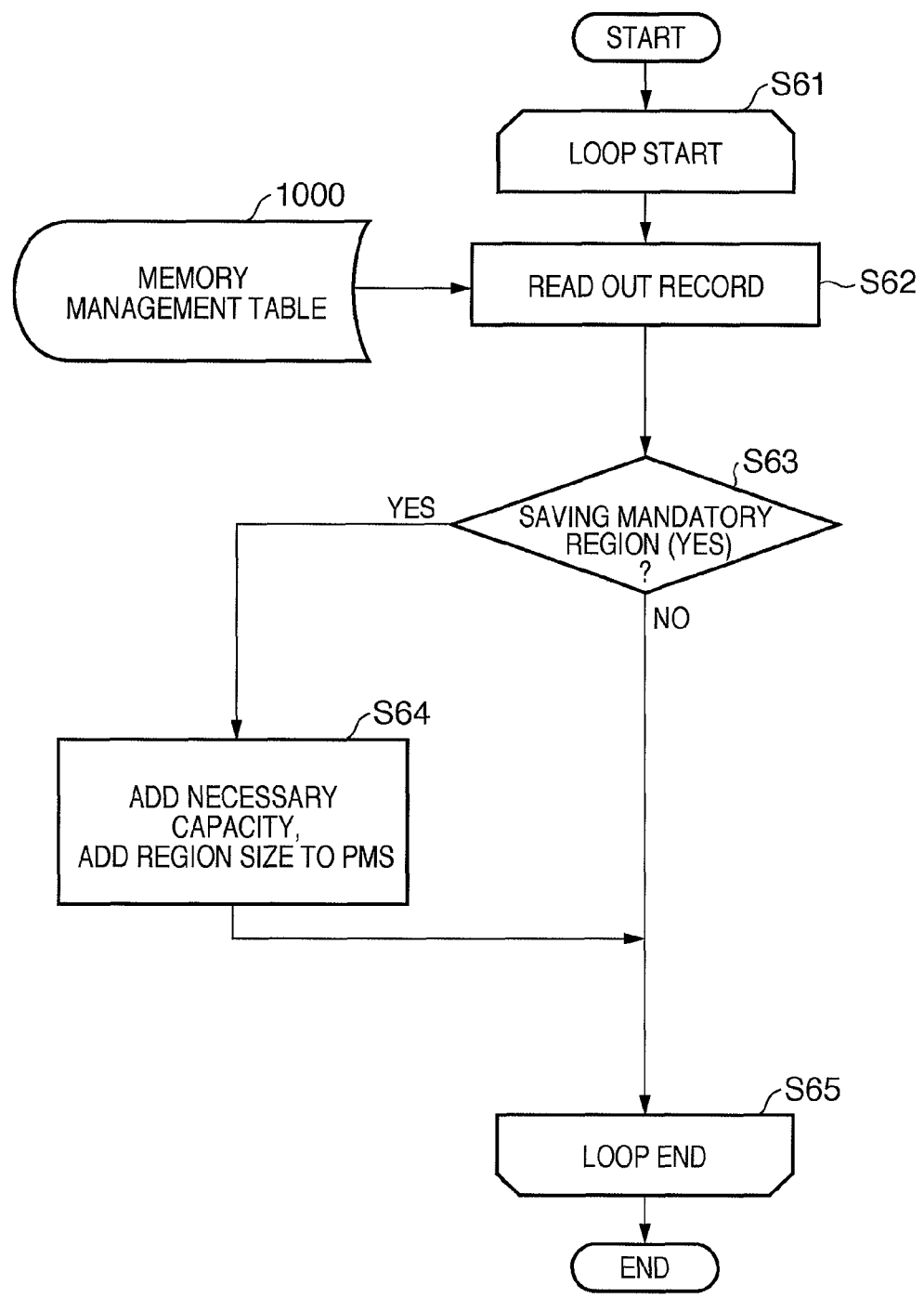
FIG. 9 is a flow chart for explaining a process of obtaining a size of mandatory region to be saved.

FIG. 9 is a flow chart for explaining a process of obtaining a size of mandatory region to be saved.

FIG. 10 is an explanatory view of a data configuration example of a memory management table 1000.

The memory management table 1000 manages regions of the image forming apparatus 100 of the present embodiment depending on the intended use. The memory management table 1000 includes a memory region ID 1001, a region name 1002, a start address 1003 of region, a region size 1004, and a saving mandatory flag 1005.

A unique value that can identify the region is set in the memory region ID 1001, which is also used for the identification upon saving. A name of the region is set with characters in the region name 1002, and aside from the memory region ID 1001, a name easy for an administrator to understand is set. A start address of the region is set in the start address 1003 of region, and a region size (capacity) is set to the region size 1004. At the time of saving, data of the region size from the start address is saved in the USB memory 111 as a saving destination. The saving mandatory flag 1005 indicates whether the region cannot be resumed from hibernation if not saved in the USB memory 111. The saving mandatory flag 1005 is "No" for a region that can be restored if loaded from the ROM 102 or for a region that is not mandatory for saving. The saving mandatory flag 1005 is "Yes" for a region that cannot be loaded if not saved.

The total size PMS of the mandatory regions to be saved can be calculated by referring to the memory management table 1000. An example of the calculation method will be described using a flow chart of FIG. 9.

In FIG. 9, one record of the memory management table 1000 is first read out in step S62. In step S63, the saving mandatory flag 1005 of the record is referenced. If the saving mandatory flag is "Yes", in step S64, the region size 1004 is added to the total size PMS of the mandatory regions to be saved. The total size PMS of the mandatory regions to be saved can be obtained by repeating this (steps S61 to S65) for all records.

The comparison of the obtained total size PMS of the mandatory regions to be saved and the free space FS of the USB memory 111 enables to determine whether the hibernation start-up by partial saving can be performed.

The above processes determine the ultimate start-up method as "all region hibernation", "partial region hibernation", or "normal start-up". The determination result is stored in the field of start-up method 801 of the hibernation setting information table 800 and is referenced at the next start-up. In case of a start-up by partial region hibernation, all memory region IDs 1001 of the memory regions saved in the USB memory 111 are stored in the memory region to be saved field of the device ID 802. This enables to recognize which region should be loaded from the USB memory 111 in case of a start-up by partial region hibernation.

A shutdown process when the all region hibernation is determined as the start-up method will be described using a flow chart of FIG. 11.

Figure 11:
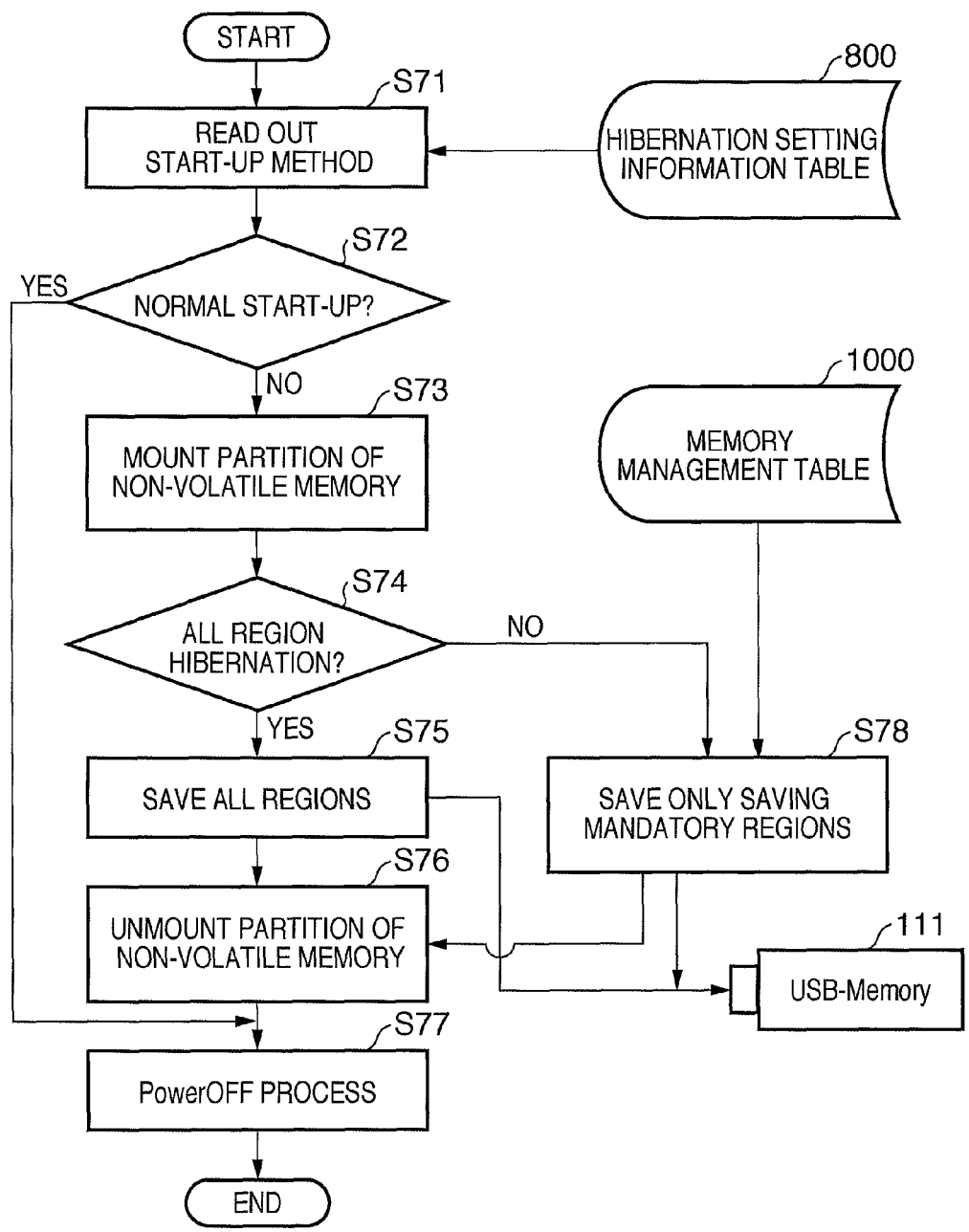
FIG. 11 is a flow chart for explaining a shutdown process by all region hibernation and partial region hibernation.

FIG. 11 is a flow chart for explaining the shutdown process by the all region hibernation and the partial region hibernation.

In step S71, the start-up method 801 is read out from the hibernation setting information table 800. In step S72, whether the normal start-up is determined as the start-up method is determined. If the normal start-up is determined as the start-up method ("YES" in step S72), the process proceeds to step S77, and the power is turned off without specifically executing the saving process.

The process proceeds to step S73 if the normal start-up is not determined as the start-up method in step S72 ("NO" in step S72), and the partition of the USB memory 111 is mounted on to perform hibernation. The process proceeds to step S74 to determine whether the start-up method is the all region hibernation. The process proceeds to step S75 if the start-up method is the all region hibernation ("YES" in step S74), and all regions of the main memory are saved in the USB memory 111. On the other hand, the process proceeds to step S78 if the start-up method is not the all region hibernation ("NO" in step S74), and the partial region hibernation is performed. This process will be described in detail later. The process proceeds to step S76 after saving of all regions is completed in step S75, and the partition of the USB memory 111 is unmounted. The process proceeds to step S77 to execute a process for turning off the power.

The execution of the processes enables to save all regions of the main memory to the USB memory before shutting down when the determined start-up method is the all region hibernation.

A process of saving by the partial region hibernation will be described still using the flow chart of FIG. 11.

As described, if the start-up method is determined not to be the all region hibernation in the start-up method determination process of step S74 ("NO" in step S74), the partial region hibernation is set. In that case, the process proceeds to step S78 to reference the memory management table 1000, acquire information of the saving mandatory regions, and save data of only the saving mandatory regions of the main memory to the USB memory 111. The memory management table 1000 is also stored in the EEPROM 116 as it is necessary for the loading process at the next start-up upon the power-on. As in the process of the all region hibernation, the partition of the USB memory 111 is then unmounted in step S76 after the completion of data saving. In step S77, a process for turning off the power is executed to finish the shutdown.

The process allows the shutdown after actually saving the data of the main memory to the USB memory device in accordance with the determined start-up method.

A start-up method changing process when the USB memory 111 as the saving destination at the last shutdown is not mounted upon the start-up in accordance with the start-up method determined at the time of power-on will be described using flow charts of FIGS. 12A and 12B.

Figure 12A:
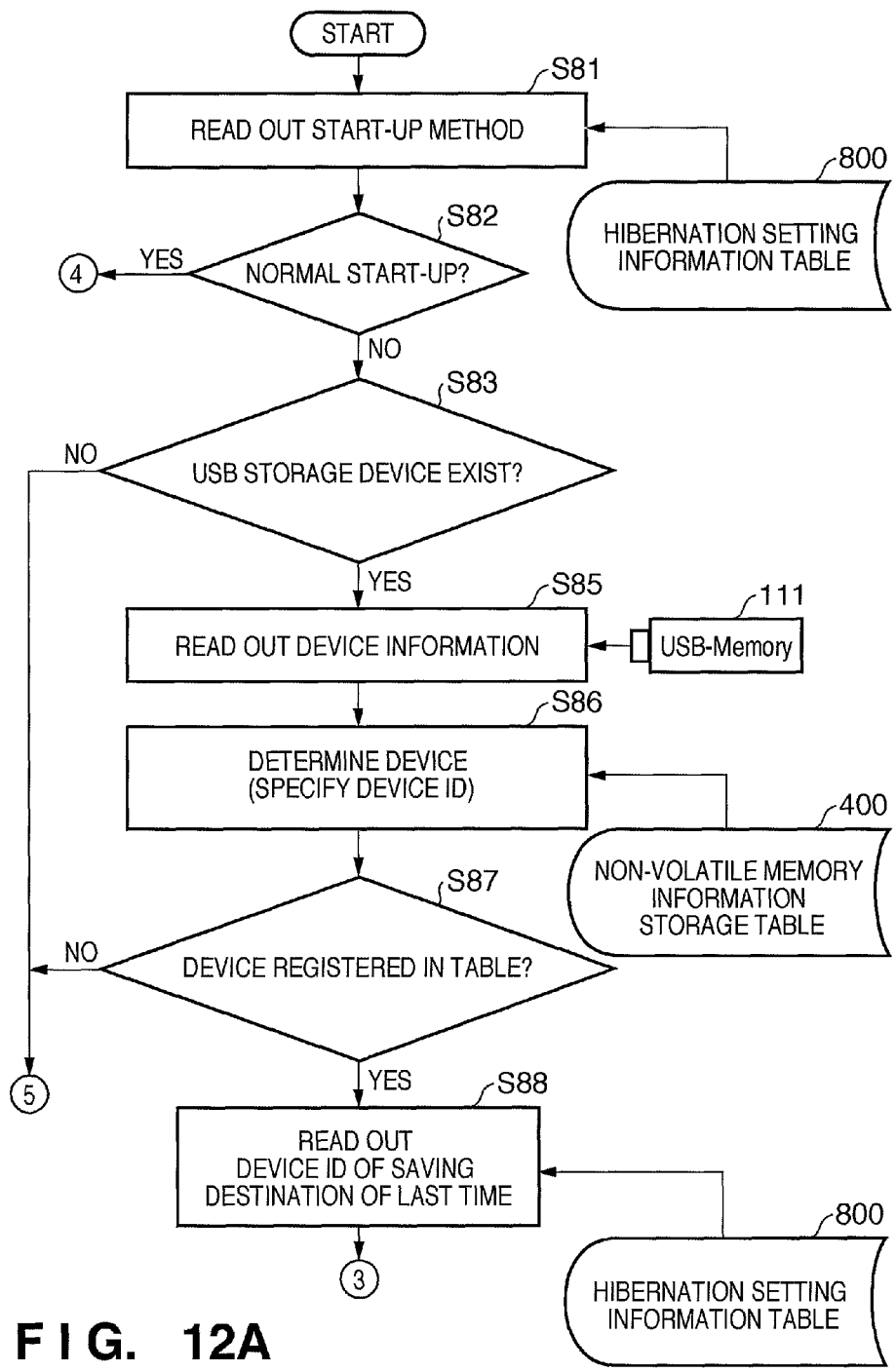
FIGS. 12A and 12B are flow charts for explaining a process of starting up after changing the start-up method at the time of power-on in the image forming apparatus according to the present embodiment.
Figure 12B:
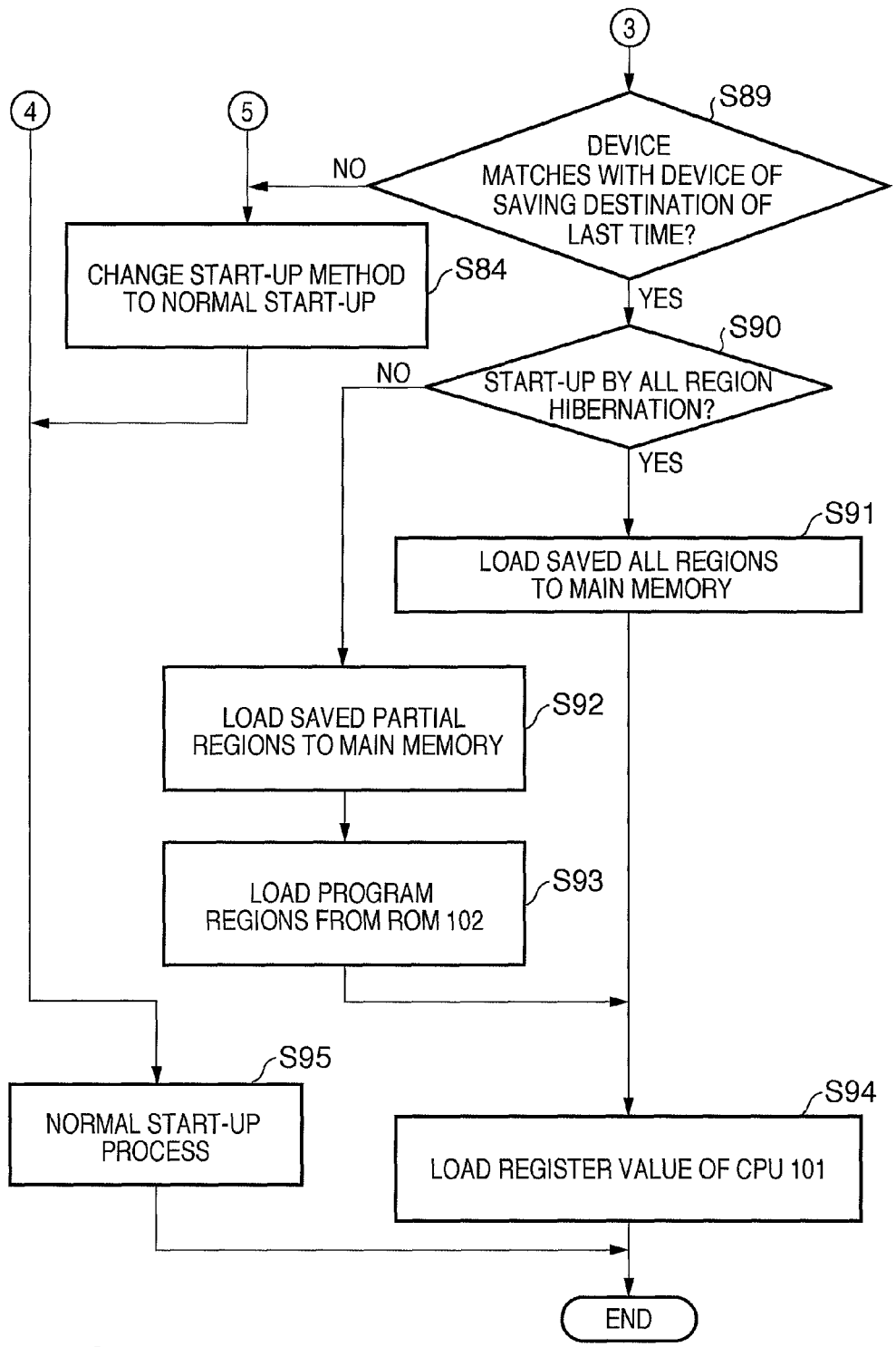

FIGS. 12A and 12B are a flow chart for explaining a process of starting up after changing the start-up method at the time of power-on in the image forming apparatus according to the present embodiment.

In step S81, the start-up method is read out by referring to the start-up method 801 of the hibernation setting information table 800 at the start of the start-up. In step S82, whether the read out start-up method is the normal start-up is determined. The process proceeds to step S95 if the start-up method is the normal start-up ("YES" in step S82), and a normal start-up process is executed. On the other hand, if the start-up method is not the normal start-up in step S82 ("NO" in step S82), whether the USB memory 111 is mounted is determined in step S83 to resume from hibernation. If the USB memory 111 is not connected ("NO" in step S83), the saved data cannot be loaded. Therefore, the process proceeds to step S84 to change the start-up method to the normal start-up. The process then proceeds to step S95 to execute the normal start-up process.

On the other hand, if the USB memory 111 is connected in step S83 ("YES" in step S83), the process proceeds to step S85 to read out device information of the USB memory 111.

In step S86, which of the devices stored in the non-volatile memory information storage table 400 is the USB memory 111 is determined. If a matched device exists in step S87 ("YES" in step S87), the device ID is specified. In step S89, whether the device is registered in the non-volatile memory information storage table 400 is determined. If the device is determined not registered ("NO" in step S89), the process proceeds to step S84. The device is determined not to include data at the start-up, and the start-up method is changed to the normal start-up. The normal start-up process is executed in step S95.

On the other hand, if the device is determined to be registered in step S87 ("YES" in step S87), the device ID 802 of the hibernation setting information table 800 is read out in step S88. In step S89, the comparison with the device ID of the connected USB memory 111 is performed, and whether the device ID 802 and the device ID of the connected USB memory 111 match is determined. The step proceeds to step S84 if they do not match ("NO" in step S89), and the device is determined not to be the USB memory 111 as the saving destination of data of the last time. In step S84, the start-up method is changed to the normal start-up, and the normal start-up process is executed in step S95.

On the other hand, if the devices are determined to match in step S89 ("YES" in step S89), a resume start-up by hibernation is determined to be possible in step S90. Whether the start-up is based on the all region hibernation is then determined. If it is determined that the start-up is based on the all region hibernation ("YES" in step S90), the data of all regions saved in the USB memory 111 is read out and loaded to the main memory in step S91. In step S94, a register value of the CPU 101 is loaded, and the resume start-up by hibernation is completed.

On the other hand, the process proceeds to step S92 if it is determined that the start-up is based on the partial region hibernation in step S90 ("NO" in step S90), the data of partial regions saved in the USB memory 111 is loaded to the main memory. The process proceeds to step S93, and the regions not saved, such as a program region, are loaded from the ROM 102. The process proceeds to step S94, and the register value of the CPU 101 is loaded to complete the resume start-up by hibernation.

The start-up method changing process enables to automatically switch to the normal resumption to start up the image forming apparatus when the USB memory 111 is not connected or when a USB memory different from the USB memory 111 as the saving destination is connected.

As described, according to the present embodiment, a mounted non-volatile memory device can be used to automatically select and start up a start-up method with optimal start-up time.

The free space of the non-volatile memory device connected by the user is searched to determine if saving of data of all regions (saving target regions) of the main memory is possible or if saving of data of partial regions is possible. Saving the data of all regions or saving the partial data in accordance with the determination enables to automatically select a save/start-up method that can be performed by the non-volatile memory device connected by the user to thereby implement hibernation.

If a non-volatile memory device that has saved data is not connected when the power is on, or if the device is replaced by a non-volatile memory device that is different from the non-volatile memory device that has saved the data, the start-up can be automatically switched to the normal start-up in which the hibernation function is not implemented. This enables to normally start up the device even if the non-volatile memory device is accidentally removed or replaced.

Other Exemplary Embodiments

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2007-321264, filed December 12, which is hereby incorporated by reference herein in its entirety.

What is claimed is:

1. An information processing apparatus on which an external non-volatile storage device is mountable, the information processing apparatus comprising:
a data processing unit configured to execute data processing;
a volatile storage unit configured to store data used for the data processing by the data processing unit;
a power supply unit configured to supply power to the data processing unit and the volatile storage unit;
a mount unit configured to mount the external non-volatile storage device;
a measurement unit configured to measure performance of the external non-volatile storage device mounted by the mount unit by dividing an amount of data written to and read from the external non-volatile storage device by a time required for reading and writing the amount of data;
an estimation unit configured to estimate a resume time from hibernation state using hibernation data stored in the external non-volatile storage device based on dividing memory size of the volatile storage unit by the performance of the external non-volatile storage device measured by the measurement unit;
a first control unit configured to control to store the data used for the data processing from the volatile storage unit to the external non-volatile storage device as hibernation data if the resume time estimated by the estimation unit is shorter than a start-up time from power off state without hibernation data, and to control not to store the data used for the data processing from the volatile storage unit to the external non-volatile storage device if the resume time estimated by the estimation unit is longer than the start-up time, when a shutdown process is initiated to cut off power supply from the power supply unit to the data processing unit and the volatile storage unit;
a second control unit configured to control to read out the hibernation data from the external non-volatile storage device to the volatile storage unit if the hibernation data is stored in the external non-volatile storage device, when the power supply from the power supply unit to the data processing unit and the volatile storage unit is resumed; and
a start-up method storage unit configured to store information indicative of starting up from the hibernation state in a non-volatile manner if the power supply to the data processing unit and the volatile storage unit is resumed when the resume time from the hibernation state estimated by the estimation unit is shorter than the start-up time,
wherein the second control unit controls to read out the hibernation data from the external non-volatile storage device to the volatile storage unit if the information indicative of starting up from the hibernation state is stored in the start-up method storage unit when the power supply to the data processing unit and the volatile storage unit is resumed.

2. The information processing apparatus according to claim 1, further comprising:
a save determination unit configured to determine whether all data stored in saving target regions of the volatile storage unit can be saved in the external non-volatile storage device when the shut down process is initiated to cut off power supply from the power supply unit to the data processing unit and the volatile storage unit; and
a determination unit configured to determine whether a start-up from hibernation state in which data of part of regions of the saving target regions is saved in the external non-volatile storage device is possible when the save determination unit determines that not all data can be saved in the external non-volatile storage device, wherein
a start-up method from the hibernation state is determined in accordance with determination by the save determination unit and the determination unit.

3. The information processing apparatus according to claim 1, further comprising:
an acquired information storage unit configured to store information of the external non-volatile storage device in a non-volatile manner, wherein
the second control unit changes the start-up method stored in the start-up method storage unit and starts up the information processing apparatus when the information of the external non-volatile storage device and the information stored in the acquired information storage unit do not match at the start-up from the hibernation state.

4. The information processing apparatus according to claim 1, wherein
the external non-volatile storage device is a Universal Serial Bus memory.

5. The information processing apparatus according to claim 3, wherein
the information of the external non-volatile storage device includes information indicative of a storage capacity of the external non-volatile storage device.

6. A start-up method of an information processing apparatus on which an external non-volatile storage device is mountable, the information processing apparatus comprising: a data processing unit configured to execute data processing; a volatile storage unit configured to store data used for the data processing by the data processing unit; and a power supply unit configured to supply power to the data processing unit and the volatile storage unit, the start-up method comprising:
measuring performance of the mounted external non-volatile storage device by dividing an amount of data written to and read from the external non-volatile storage device by a time required for reading and writing the amount of data;
estimating a resume time from hibernation state using hibernation data stored in the external non-volatile storage device based on dividing memory size of the volatile storage unit by the performance of the external non-volatile storage device measured at the measuring step;
controlling to store the data used for the data processing from the volatile storage unit to the external non-volatile storage device as hibernation data if the estimated resume time is shorter than a start-up time from power off state without hibernation data and controlling not to store the data used for the data processing from the volatile storage unit to the external non-volatile storage device if the estimated resume time is longer than the start-up time when a shut down process is initiated to cut off power supply from the power supply unit to the data processing unit and the volatile storage unit;
controlling to read out the hibernation data from the external non-volatile storage device to the volatile storage unit if the hibernation data is stored in the external non-volatile storage device, when the power supply from the power supply unit to the data processing unit and the volatile storage unit is resumed; and
storing information indicative of starting up from the hibernation state in a non-volatile manner if the power supply to the data processing unit and the volatile storage unit is resumed when the resume time from the hibernation state estimated in the estimating step is shorter than the start-up time,
wherein, in the step of controlling to read out the hibernation data from the external non-volatile storage device to the volatile storage unit, the hibernation data is read out from the external non-volatiles storage device to the volatile storage unit if the information indicative of starting up from the hibernation state is stored in the storing step when the power supply to the data processing unit and the volatile storage unit is resumed.

\* \* \* \* \*